United States Patent
Tanaka et al.

(10) Patent No.: US 8,527,716 B2
(45) Date of Patent: Sep. 3, 2013

(54) VOLUME SHARING METHOD AND STORAGE SYSTEM USING THE SAME

(75) Inventors: Toru Tanaka, Sagamihara (JP); Noriko Nakajima, Machida (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 13/262,962

(22) PCT Filed: Sep. 20, 2011

(86) PCT No.: PCT/JP2011/005281
§ 371 (c)(1),
(2), (4) Date: Oct. 5, 2011

(87) PCT Pub. No.: WO2013/042160
PCT Pub. Date: Mar. 28, 2013

(65) Prior Publication Data
US 2013/0073780 A1    Mar. 21, 2013

(51) Int. Cl.
*G06F 13/00* (2006.01)
(52) U.S. Cl.
USPC .............. 711/153; 711/6; 711/203; 711/221
(58) Field of Classification Search
USPC ..................... 711/6, 153, 203, 221
See application file for complete search history.

(56) References Cited

U.S. PATENT DOCUMENTS

| | | | |
|---|---|---|---|
| 6,594,744 B1 | 7/2003 | Humlicek et al. | |
| 6,857,001 B2 | 2/2005 | Hitz et al. | |
| 7,865,677 B1 | 1/2011 | Duprey et al. | |
| 2007/0073783 A1 | 3/2007 | Honami et al. | |
| 2008/0034005 A1 | 2/2008 | Satoyama et al. | |
| 2009/0210875 A1 | 8/2009 | Bolles et al. | |
| 2010/0100696 A1* | 4/2010 | Suzuki | 711/162 |
| 2010/0250878 A1 | 9/2010 | Ichikawa et al. | |

FOREIGN PATENT DOCUMENTS

JP        2008-40571 A      2/2008

* cited by examiner

*Primary Examiner* — Reba I Elmore
(74) *Attorney, Agent, or Firm* — Volpe and Koenig, P.C.

(57) ABSTRACT

Since only one golden image (GI) of a snapshot can exist and is shared among a plurality of storage apparatuses, there was a problem that migration or copy thereof deteriorates the capacity efficiency and increases the cost for managing consistency. The present invention solves the above-mentioned problem by either (1) a direct sharing method of generating a parent-child relationship of snapshots among different storage apparatuses at the time of creating differential LUs from the GI or (2) a virtual sharing method of creating virtual LUs of the GI in the respective storage apparatuses and creating differential LUs of the snapshots from the created virtual LUs, using a storage virtualization function among a plurality of storage apparatuses.

12 Claims, 12 Drawing Sheets

| VM | HOST_LU | LU | VHDD |
|---|---|---|---|
| 1010 | 1011 | 1411 | 1021 |
| 1020 | 1012 | 1412 | 1022 |
| 1030 | 1013 | 1511 | 1023 |
| 1040 | 1014 | 1512 | 1024 |

FIG. 7

| EX_STORAGE | EX_LU | IN_STORAGE | IN_LU |
|---|---|---|---|
| 1400 | 1414 | 1400 | 1415 |

FIG. 8

| EX_STORAGE | EX_LU | IN_STORAGE | IN_LU |
|---|---|---|---|
| 1500 | 1514 | 1400 | 1415 |

FIG. 9

| STORAGE | PARENT_LU | CHILD_LU | POOL |
|---|---|---|---|
| 1400 | G1 | 1411 | 1413 |
| 1400 | G1 | 1412 | 1413 |

FIG. 10

| STORAGE | PARENT_LU | CHILD_LU | POOL |
|---|---|---|---|
| 1500 | G1 | 1511 | 1513 |
| 1500 | G1 | 1512 | 1513 |

FIG. 11

| GLOBAL_LU | STORAGE | LOCAL_LU | GI |
|---|---|---|---|
| G1 | 1400 | 1414 | TRUE |
| G1 | 1500 | 1514 | TRUE |

VOLUME SHARING METHOD AND STORAGE SYSTEM USING THE SAME

TECHNICAL FIELD

The present invention relates to a volume management method in a storage system, specifically to a technology of reducing operational cost of a storage apparatus.

BACKGROUND ART

Recently, by the improved performance of computers, it became possible to make a plurality of virtual computers (virtual machines, hereinafter referred to as "VMs") operate in a physical computer. A VM performs various types of processing by starting up an operating system (hereinafter referred to as an "OS") installed in a virtual storage device (a Virtual Hard Disk Drive, hereinafter referred to as a VHDD).

Furthermore, a technology of creating a snapshot (a child file) for which write can be performed from a parent file in a file system is known (Patent Literature 1). According to this technology, if write occurs in a snapshot, differential data which occurred by write is stored in another storage area than the snapshot, and the storage destination of the differential data is changed to the other storage area. By utilizing the writable snapshot, the commonly utilized OSs, applications, and others can be created from an image referred to as a Golden Image (a parent file which has no parent thereof and is hereinafter also referred to as a GI) into a plurality of VMs.

Furthermore, a technology for being able to uniquely identify a volume in a plurality of storage apparatuses is published (Patent Literature 2). According to this technology, by sharing an identifier for making a volume and a storage apparatus unique among a plurality of storage apparatuses, the operation for a specific volume can be performed among the plurality of storages.

CITATION LIST

Patent Literature

[Patent Literature 1] U.S. Pat. No. 6,857,001
[Patent Literature 2] Japanese Patent Application Laid-Open (Kokai) No. 2008-040571
(US Patent Application Publication No. 2008/0034005)

SUMMARY OF INVENTION

Technical Problem

However, by the technology of the Patent Literature 1, there was a problem that only one snapshot GI can exist and that, if migration, copy, and other operations are performed for sharing the GI among the plurality of storages, another snapshot tree occurs, which deteriorates the capacity efficiency and increases the management cost. Furthermore, there was a problem that a snapshot (LU) which is the data input/output destination and a pool (LU) in which the differential data is stored are managed individually, which deteriorates the data input/output performance.

Furthermore, by the technology of the Patent Literature 2, there was a problem that, although an identifier for making a volume and a storage apparatus unique among a plurality of storage apparatuses can be shared, identifiers as shared information increase along with the increase of differential volumes, which deteriorates the performance for volumes.

Therefore, the present invention is created in view of the above-mentioned problems, and the purpose thereof is to improve the disk capacity efficiency while sharing the GI and also improve the access performance for volumes.

Solution to Problem

The above-mentioned problems are solved by utilizing a storage virtualization function (a function by which one storage apparatus gets an LU in another storage apparatus to be recognized as an LU virtually and makes the software resources in the LU such as OSs and APs usable) among a plurality of storage apparatuses either by (1) a direct sharing method of generating a parent-child relationship of snapshots among different storage apparatuses at the time of creating differential LUs from the GI, or by (2) a virtual sharing method of creating virtual LUs of the GI in the respective storage apparatuses and creating differential LUs of snapshots from the created virtual LUs.

Specifically speaking, in a storage system configured of two or more storage apparatuses each of which comprises an interface unit which is coupled to a computer operating a plurality of virtual computers and is coupled to the virtual computers via a network and a control unit and a storage unit which are coupled to the interface unit, wherein a logical volume in a first storage apparatus is assigned to a differential virtual logical volume of the relevant first storage apparatus and is also assigned to a differential virtual logical volume of a second storage apparatus so that the logical volume is shared, and a logical volume of the first storage apparatus and a differential virtual logical volume of the first storage apparatus or a differential virtual logical volume of the second storage apparatus are assigned to the virtual computer by the control unit of the first storage apparatus.

Furthermore, in the storage system, the logical volume in the first storage apparatus is assigned to the virtual logical volume of the relevant first storage apparatus and is also assigned to the virtual logical volume of the second storage apparatus and the logical volume is shared, a differential virtual logical volume for the virtual logical volume of the first storage apparatus is assigned to the virtual logical volume of the first storage apparatus, a differential virtual logical volume for the virtual logical volume of the second storage apparatus is assigned to the virtual logical volume of the second storage apparatus, and a logical volume in the first storage apparatus and a differential virtual logical volume of the first storage apparatus or a differential virtual logical volume of the second storage apparatus are assigned to the virtual computer by the control unit of the first storage apparatus.

Furthermore, the present invention provides a volume sharing method for a storage system configured of two or more storage apparatuses each of which comprises an interface unit which is connected to a computer operating a plurality of virtual computers and is coupled to the virtual computers via a network and a control unit and a storage unit which are connected to the interface unit, the volume sharing method comprising a step wherein a logical volume of a first storage apparatus is assigned to a differential virtual logical volume of the relevant first storage apparatus and is also assigned to a differential virtual logical volume of a second storage apparatus so that the logical volume is shared, and a step wherein a logical volume of the first storage apparatus and a differential virtual logical volume of the first storage apparatus or a differential virtual logical volume of the second storage apparatus are assigned to the virtual computer, which are performed by the control unit of the first storage apparatus.

In addition, the present invention provides the above storage system, wherein the volume sharing method comprised of a step wherein a logical volume in the first storage apparatus is assigned to the virtual logical volume of the relevant first storage apparatus and is also assigned to the virtual logical volume of the second storage apparatus and the logical volume is shared, a step wherein a differential virtual logical volume for the virtual logical volume of the first storage apparatus is assigned to the virtual logical volume of the first storage apparatus, a step wherein a differential virtual logical volume for the virtual logical volume of the second storage apparatus is assigned to the virtual logical volume of the second storage apparatus, and a step wherein a logical volume in the first storage apparatus and a differential virtual logical volume of the first storage apparatus or a differential virtual logical volume of the second storage apparatus are assigned to the virtual computer, which are performed by the control unit of the first storage apparatus.

Advantageous Effects of Invention

By the present invention, the GI can be shared while improving the disk capacity efficiency and the management cost can be reduced.

DESCRIPTION OF EMBODIMENTS

Hereinafter, the embodiments of the present invention are explained in detail with reference to the figures.
<Embodiment 1>
Firstly, a general overview of Embodiment 1 is explained with reference to Figures from 1 to 12. It should be noted that the present invention specifies that a GI of the storage apparatus 1400 used by a computer 1000 is shared by the other storage apparatus 1500 and others.

Figure 1:
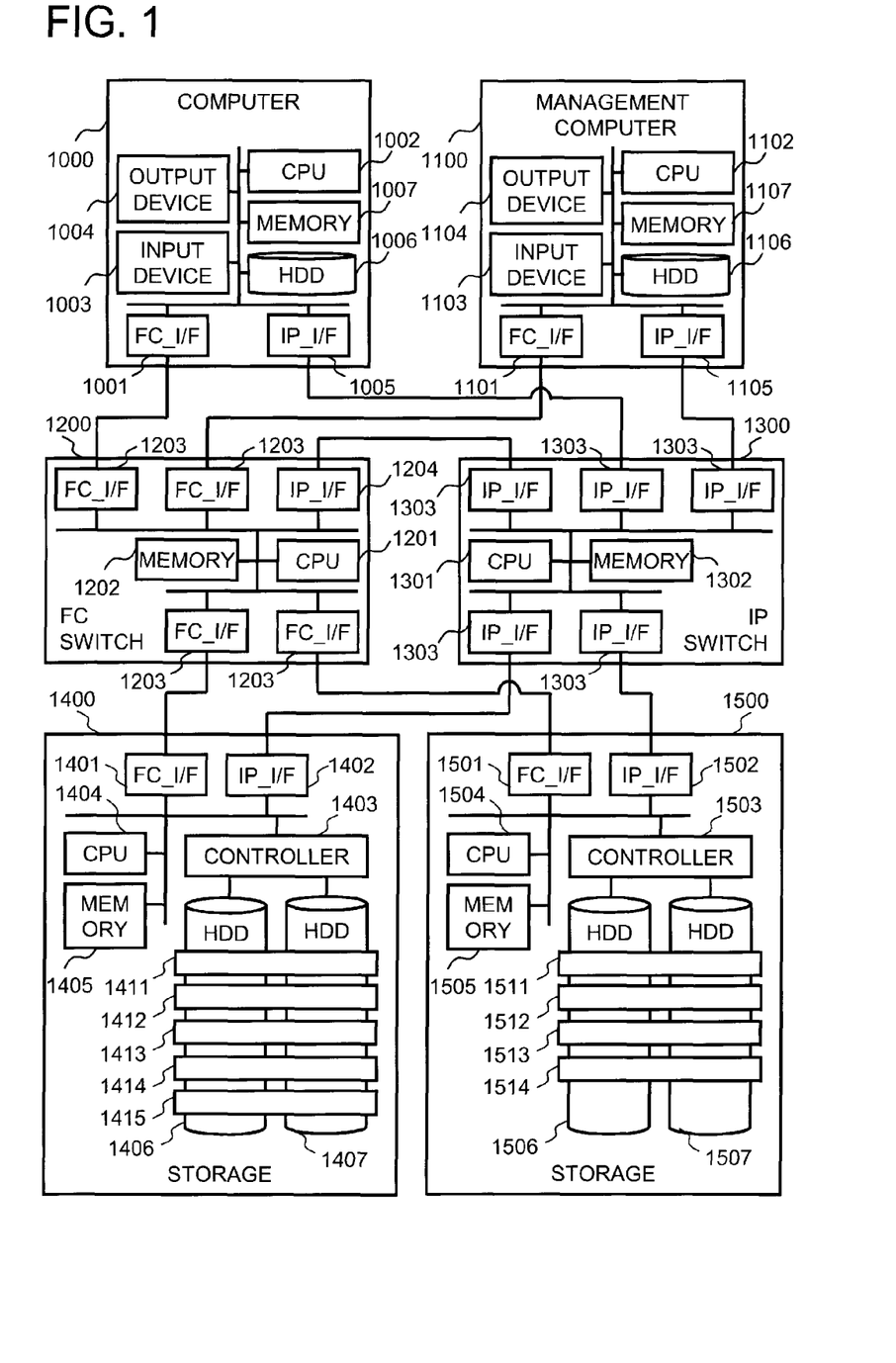
FIG. 1 is a diagram for explaining a system configuration of the present invention.

FIG. 1 shows a system configuration in the present embodiment. The computer 1000 in FIG. 1 is a computer which performs input/output for the storage apparatuses 1400 and 1500. The computer 1000 comprises an FC_I/F 1001 which transmits and receives input/output data to and from the storage apparatuses 1400 and 1500, an IP_I/F 1005 which transmits and receives management data to and from the management computer 1100, a CPU 1002 which performs programs and controls the entire computer, a memory 1007 which is a storage area of the programs, a storage device 1006 which stores the programs, user data, and others, an input device 1003 such as a keyboard and a mouse for inputting information from the user, and an output device 1004 such as a display for displaying information for the user.

The management computer 1100 is a computer for managing the computer 1000 and the storage apparatus 1400. The management computer 1100 comprises an FC_I/F 1101 which transmits and receives input/output data and control data to and from the storage apparatuses 1400 and 1500, an IP_I/F 1105 which transmits and receives management data to and from the computer 1000 and the storage apparatus 1400, a CPU 1102 which performs programs and controls the entire computer, a memory 1107 which is a storage area of the programs, a storage device 1106 which stores the programs, user data, and others, an input device 1103 such as a keyboard and a mouse for inputting information from the user, and an output device 1104 such as a display for displaying information for the user.

An FC switch 1200 is a switch device for transferring input/output data from the computer 1000 to the storage apparatus 1400 and others. The FC switch 1200 comprises an FC_I/F 1203 which transmits and receives input/output data, an IP_I/F 1204 which transmits and receives management data, a CPU 1201 which performs programs and controls the entire FC switch, and a memory 1202 which is a storage area of the programs and data.

An IP switch 1300 is a switch device for transferring management data from the management computer 1100 to the computer 1000 and others. The IP switch 1300 comprises an IP_I/F 1303 which transmits and receives management data, a CPU 1301 which performs programs and controls the entire IP switch, and a memory 1302 which is a storage area of the programs and data.

The storage apparatus 1400 is a node which processes input/output data from the computer 1000. The storage apparatus 1400 comprises an FC_I/F 1401 which receives input/output data from the FC switch, an IP_I/F 1402 which receives management data from the management computer 1100, a controller 1403 which controls HDDs 1406 and 1407, a CPU 1404 which performs programs and controls the entire storage apparatus, a memory 1405 which is a storage area of the programs, HDDs 1406 and 1407 in which user data is saved, and LUs 1411, 1412, 1413, 1414, and 1415 which are storage areas of the user data.

The storage apparatus 1500 is a node which processes input/output data from the computer 1000. The storage apparatus 1500 comprises an FC_I/F 1501 which receives input/ output data from the FC switch, an IP_I/F 1502 which receives management data from the management computer 1100, a controller 1503 which controls HDDs 1506 and 1507, a CPU 1504 which performs programs and controls the entire storage apparatus, a memory 1505 which is a storage area of the programs, HDDs 1506 and 1507 in which user data is saved, and LUs 1511, 1512, 1513, and 1514 which are storage areas of the user data.

At this point, the storage apparatuses 1400 and 1500 can handle the LUs in the local and other storage apparatuses virtually as the LUs in the local storage apparatuses. For example, an LU 1514 in the storage apparatus 1500 can virtually utilize an LU 1415 in the storage apparatus 1400 while the LU 1415 in the storage apparatus 1400 actually stores the data.

In this case, if the computer 1000 performs input/output for the LU 1514 in the storage apparatus 1500, the program which is read in the memory of the storage apparatus 1500 performs input/output for the LU 1415 in the storage apparatus 1400 which is the actual LU of the virtual LU 1514.

By comprising this type of storage virtualization function in the storage apparatuses 1400 and 1500, the computer has only to perform input/output for one virtual LU, and therefore, the reduction of the management cost can be expected. Furthermore, the computer can utilize software of the storage apparatus which comprises the virtual LU and efficiently utilize the resource which is an old storage apparatus.

Figure 2:
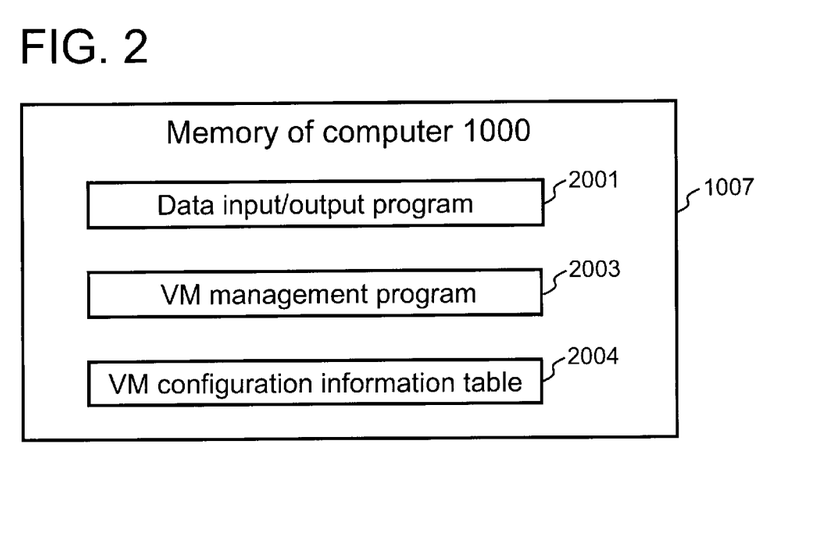
FIG. 2 is a diagram for explaining a memory configuration of a computer.

FIG. 2 shows the configuration of the memory 1007 in the computer 1000. At the time of start-up, the computer 1000 reads a data input/output program 2001 which performs data input/output for the storage apparatuses 1400 and 1500, a VM management program 2003 for making a virtual computer operate in the computer, and a VM configuration information table 2004 which is the configuration information of the virtual computer in the memory 1007.

The virtual computer is a virtual computer (VM=Virtual Machine) which enables a plurality of OSs and APs (application software) to be respectively performed independently in one actual computer, and can read configuration information and performance information in a virtual memory (physically in the memory 1007) the same as the actual computer.

Incidentally, the VM transmits and receives input/output data to and from the storage apparatuses 1400 and 1500 by utilizing the FC_I/F 1001 of the computer 1000, and reads the data input/output program 2001 in the virtual memory in the VM.

Figure 3:
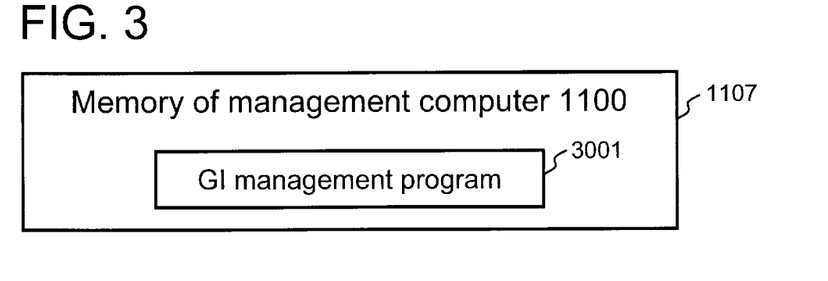
FIG. 3 is a diagram for explaining a memory configuration of a management computer.

FIG. 3 shows the configuration of the memory 1107 in the management computer 1100. At the time of start-up, the management computer 1100 reads a GI management program 3001 of the storage apparatus 1400 in the memory 1107.

Figure 4:
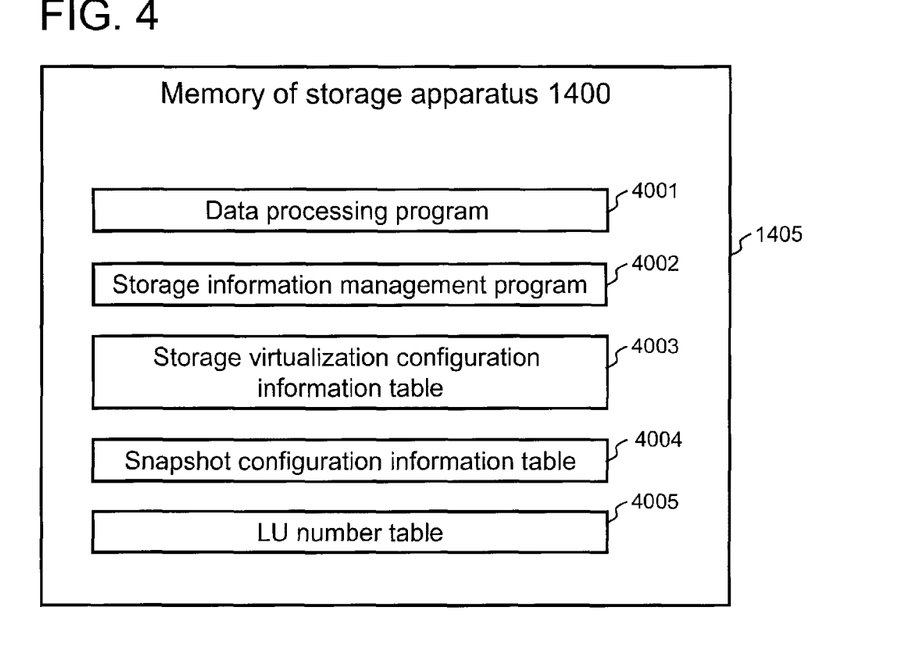
FIG. 4 is a diagram for explaining a memory configuration of a storage apparatus 1400.

FIG. 4 shows the configuration of the memory 1405 in the storage apparatus 1400. At the time of start-up, the storage apparatus 1400 reads a data processing program 4001 for making the computer 1000 and others access the storage apparatus 1400, a storage information management program 4002 for managing configuration information and performance information of the storage apparatus, a storage virtualization configuration information table 4003 which is the configuration information of the storage apparatus, a snapshot configuration information table 4004 which is pair information among LUs in the storage apparatus, and an LU number table 4005 which is correspondence information between the storage apparatus and the LUs in the memory 1405.

Figure 5:
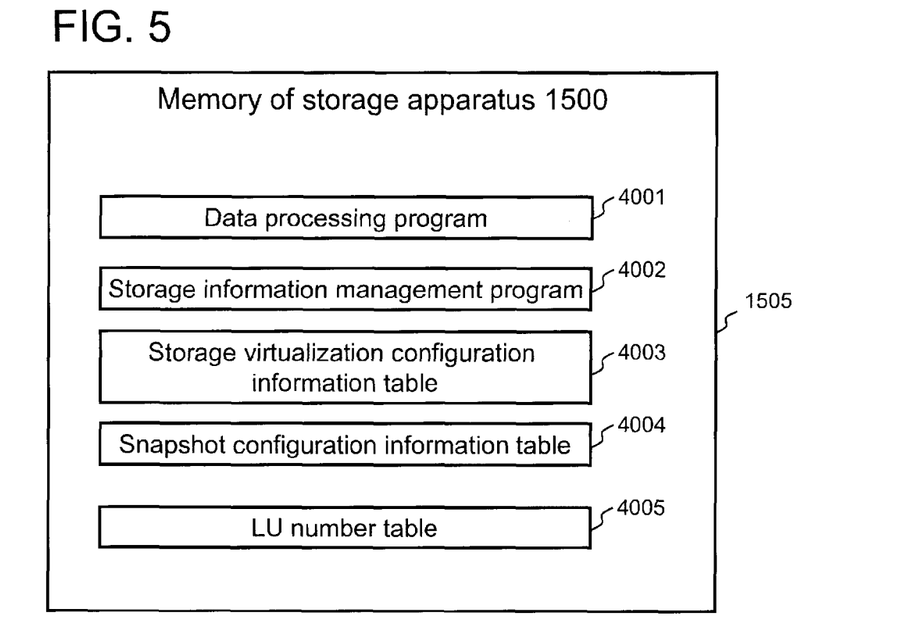
FIG. 5 is a diagram for explaining a memory configuration of a storage apparatus 1500.

FIG. 5 shows the configuration of the memory 1505 in the storage apparatus 1500. At the time of start-up, the storage apparatus 1500 reads a data processing program 4001 for making the computer 1000 and others access the storage apparatus 1500, a storage information management program 4002 for managing configuration information and performance information of the storage apparatus, a storage virtualization configuration information table 4003 which is the configuration information of the storage apparatus, a snapshot configuration information table 4004 which is pair information among LUs in the storage apparatus, and an LU number table 4005 which is correspondence information between the storage apparatus and the LUs in the memory 1505.

Figure 6:
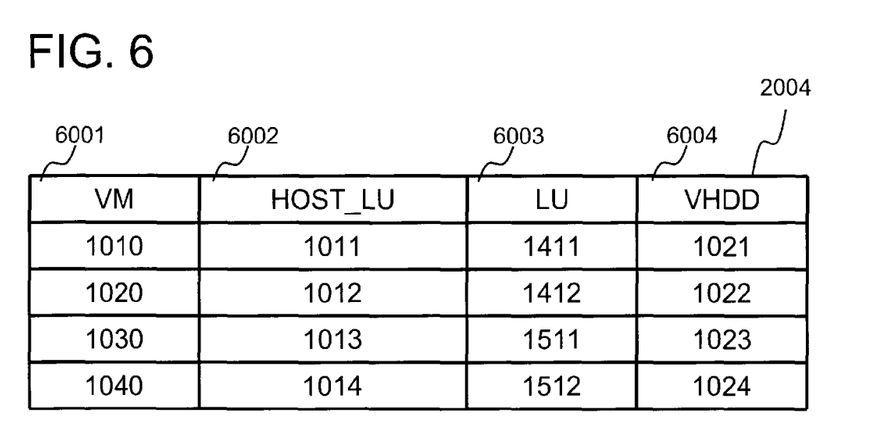
FIG. 6 is a diagram for explaining a virtual computer configuration information table.

FIG. 6 shows the configuration of the VM configuration information table 2004. The VM configuration information table 2004 comprises a VM 6001 which is an identifier of the VM, a HOST_LU 6002 which is an identifier in the host of an LU in which a virtual hard disk drive used by the VM is stored, an LU 6003 which is an identifier in the storage apparatus of the LU in which the virtual hard disk drive used by the VM is stored, and a VHDD file 6004. The VHDD file 6004 is an OS, an AP, and others used by the VM.

Figure 7:
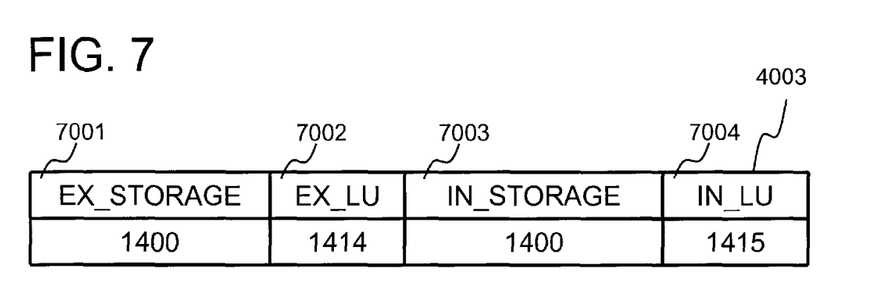
FIG. 7 is a diagram for explaining a storage virtualization configuration information table in the storage apparatus 1400.
Figure 8:
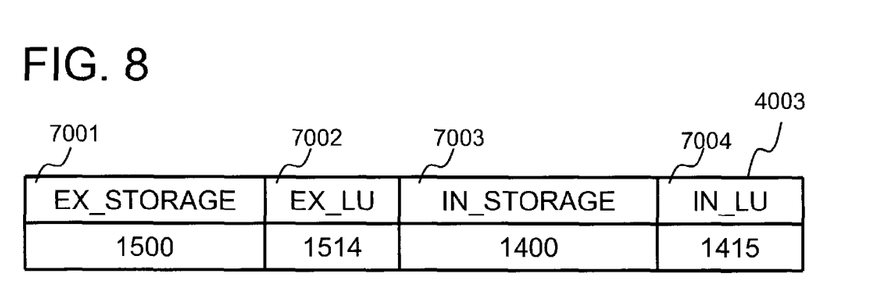
FIG. 8 is a diagram for explaining a storage virtualization configuration information table in the storage apparatus 1500.

FIG. 7 shows the configuration of the storage virtualization configuration information table 4003 in the storage apparatus 1400. The storage virtualization configuration information table 4003 comprises an EX_STORAGE 7001 which is an identifier of a storage apparatus in which a virtually recognized LU exists, an EX_LU 7002 which is an identifier of the virtually recognized LU, an IN_STORAGE 7003 which is an identifier of a storage apparatus in which the actual LU for the virtually recognized LU exists, and an IN_LU 7004 which is the actual LU for the virtually recognized LU. FIG. 8 is the configuration of the storage virtualization configuration information table 4003 in the storage apparatus 1500, and the contents thereof are the same as FIG. 7.

Figure 9:
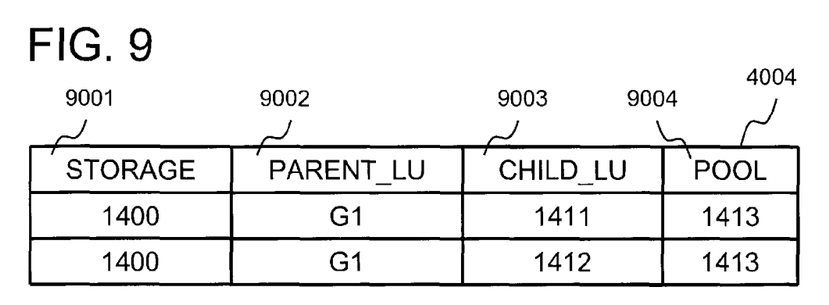
FIG. 9 is a diagram for explaining a snapshot configuration information table.
Figure 10:
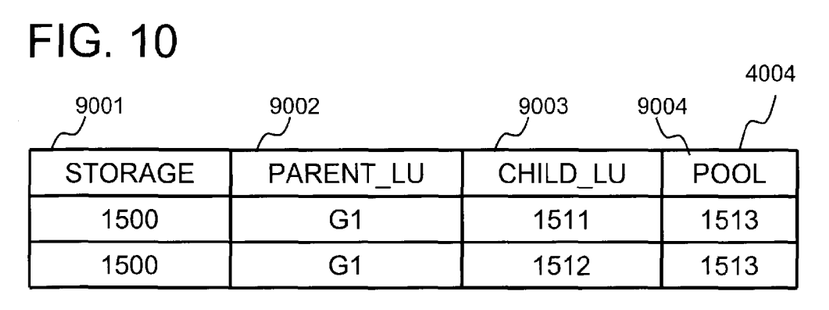
FIG. 10 is a diagram for explaining a snapshot configuration information table.

FIG. 9 shows the configuration of the snapshot configuration information table 4004 in the storage apparatus 1400. The snapshot configuration information table 4004 comprises a STORAGE 9001 which is an identifier of the storage apparatus, a PARENT_LU 9002 which is a parent LU of a snapshot pair, a CHILD_LU 9003 which is a child LU of the snapshot pair, and a POOL 9004 which is the actual data storage destination LU for the CHILD_LU. FIG. 10 shows the configuration of the snapshot configuration information table 4004 in the storage apparatus 1500, and the contents thereof are the same as FIG. 9.

Figure 11:
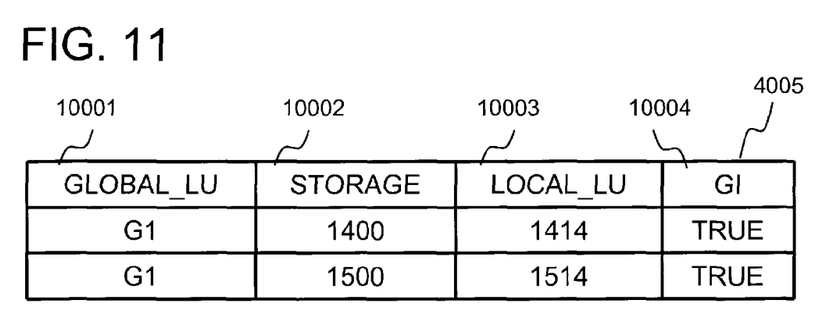
FIG. 11 is a diagram for explaining an LU number table.

FIG. 11 shows the configuration of the LU number table 4005. The LU number table 4005 comprises a GLOBAL_LU 10001 which is an LU identifier which is unique among a plurality of storages, a STORAGE 10002 which is an identifier of the storage apparatus in which an actual LU exists, and a LOCAL_LU 10003 which is an identifier of the actual LU.

Figure 12:
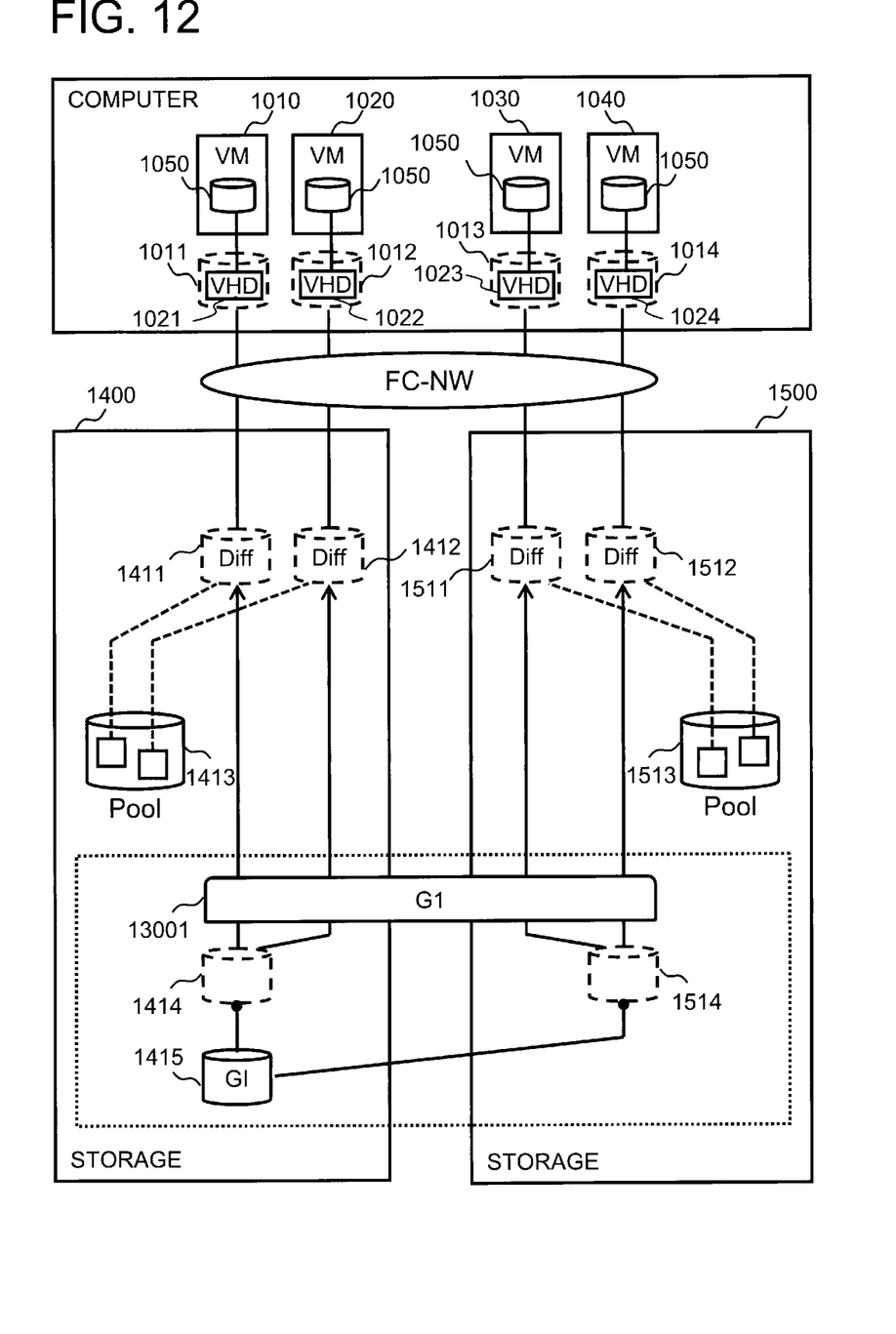
FIG. 12 is a diagram for explaining a GI configuration according to Embodiment 1 of the present invention.

FIG. 12 shows a conceptual diagram of the present embodiment. A reference sign 13001 in the figure is a global LU identifier (a GLOBAL_LU 10001 in the LU number table 4005) for uniquely identifying the LUs and the pools and does not exist in the actual system configuration.

The LUs specified by the PARENT_LUs 9002, CHILD_LUs 9003, and the POOLs 9004 in the snapshot configuration information tables 4004 shown in FIG. 9 and FIG. 10 are the LUs used by a WritableSnapshot technology. The "WritableSnapshot" is a snapshot which is an LU maintaining the status of an LU at a certain point of time and is characterized by being writable to the snapshot.

For example, a VM 1010 is mounted with (corresponds to) a VHDD 1011 and mounts a VHDD file 1021 which is a program or data such as an OS or an AP used by the VM. This VHDD file 1021 is saved in the LU 1411 in the storage apparatus 1400. This LU 1411 is referred to as a differential LU (Differential Disk), in which only the differential data from the contents of a GI (LU 1414) in which the images of the common OSs and applications are stored is stored. It should be noted that the GI is a virtual LU using the storage virtualization function, whose function is explained in detail later.

The data in the differential LU is actually stored in the hard disk configuring the pool 1413. If a write request is transmitted from the VM 1010 to the differential LU 1411, the storage apparatus 1400 confirms whether the data exists or not in the required address of the differential LU 1411 (the actual data is saved in the pool 1413) and, if the data exists, overwrites the data by the address for which the write request was made. If the data does not exist in the address, the storage apparatus 1400 writes the required address area in the pool 1413.

If a read request is transmitted from the VM 1010, the storage apparatus 1400 confirms whether the data exists or not in the required address of the differential LU 1411 and, if the data exists, transmits the data of the address to the VM.

If the data does not exist in the address, the storage apparatus 1400 transmits the data of the required address of the GI to the VM. Since this method makes it possible to store the VM specific data in the differential LU and store the VM common data in the GI, the capacity in the storage apparatus can be efficiently utilized.

The LUs specified by the EX_LUs 7002 and the IN_LUs 7004 in the storage virtualization configuration information tables shown in FIG. 7 and FIG. 8 are the LUs used by the storage virtualization function.

The storage virtualization function is a function by which a storage apparatus gets an LU in another storage apparatus to be recognized as an LU virtually and makes the software resources in the LU such as OSs and APs usable. For example, an LU 1415 which is the GI in which the data commonly used by the VMs such as OSs and software such as APs can be recognized virtually as an LU 1414 in the storage apparatus 1400 and as an LU 1514 in the storage apparatus 1500.

If a read request is transmitted to the LU 1514, the storage apparatus 1500 reads the data of required address in the storage apparatus 1400 and transmits the read data to the request source.

As explained above, there is an effect that, even if the LU 1415 stored in the storage apparatus 1400 is migrated to the storage apparatus 1500, by using the storage virtualization function, the relationship between the LU 1414 and the LU 1415 has only to be switched to the relationship with the LU 1415 migrated from the LU 1514, which does not affect the higher-level hosts and storages.

The present embodiment sets the purpose of sharing the GI which is the LU which a plurality of VMs such as OSs and applications commonly utilize among a plurality of storages. Therefore, by creating the LU 1415 which is the GI into the LU 1414 and the LU 1514 for the storage apparatuses 1400 and 1500 by the storage virtualization function, the same GI can be utilized among a plurality of storages.

At this time, by converting the LU 1414 and the LU 1514 into the common LU identifier (the identifier 13001 named G1), the common GI can be utilized in a plurality of storages. The management table of the LU identifiers common to these LUs 1414 and 1514 is the LU number table 4005.

The identifier defined as "G1" by the GLOBAL_LU 10001 in the LU number table 4005 is defined as the LU 1414 of the storage apparatus 1400 and the LU 1514 of the storage apparatus 1500 in the STORAGE 10002 and the LOCAL_LU 10003.

Furthermore, the snapshot configuration information tables 4004 defined in FIG. 9 and FIG. 10 indicate that, with the identifier "G1" of the LU 13001 which is the GI as the parent, the differential LU 1411 and the differential LU 1412 are created in the storage apparatus 1400 while the differential LU 1511 and the differential LU 1512 are created in the storage apparatus 1500.

It should be noted that the present embodiment is not intended to limit the existence of the LU number table 4005 in the management computer 1100. For example, it may also be permitted that the LU number table 4005 is saved in the storage apparatus 1400, the FC switch 1200, and the computer 1000.

Figure 13:
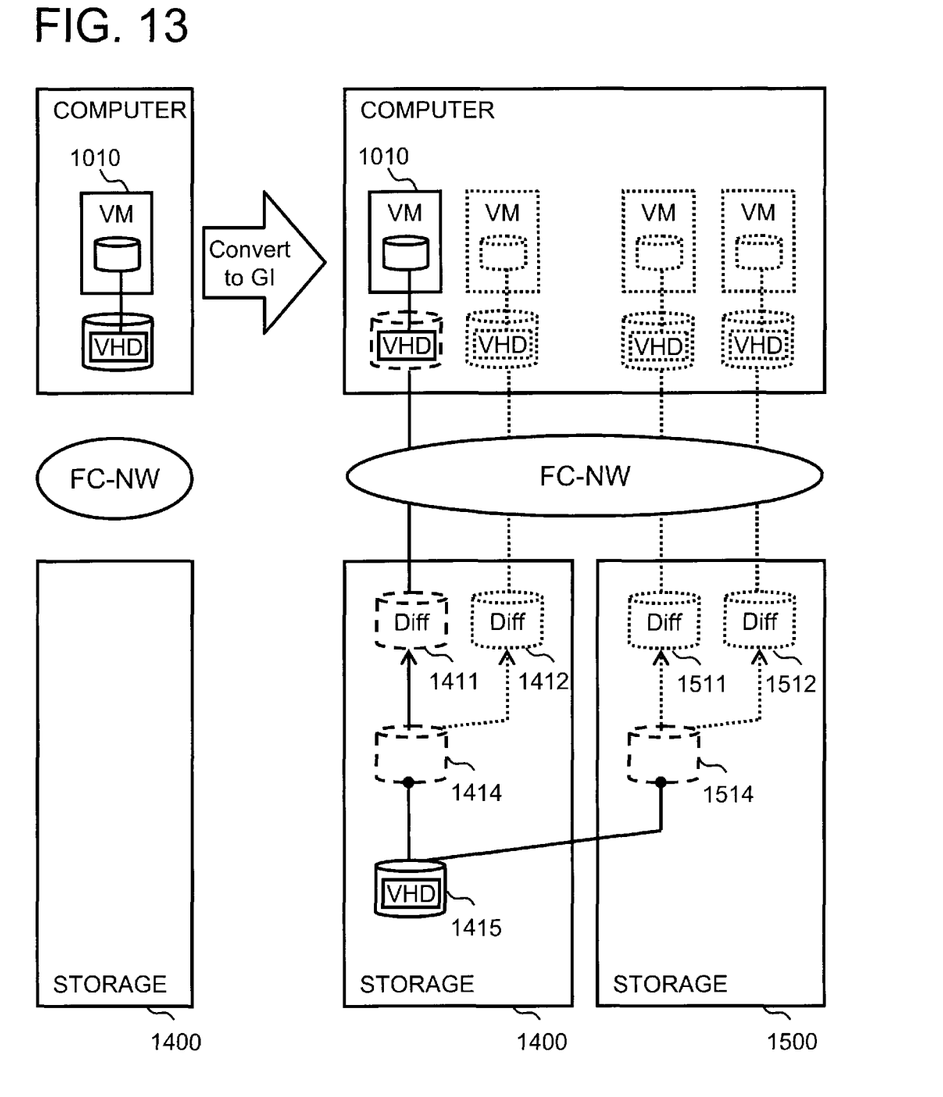
FIG. 13 is a diagram for explaining GI creation processing according to Embodiment 1 of the present invention.

FIG. 13 shows a conceptual diagram of the procedure and the configuration for converting a created VM into a GI (golden image). For example, if a VM 1010 stored in the storage device 1006 of the computer 1000 is converted into a GI, an LU in which a VHDD used by the VM 1010 is stored is copied or migrated to the storage apparatus 1400 and the LU 1415 is created. Furthermore, the virtual LU 1414 and the virtual LU 1514 are created from the LU 1415 by using the storage virtualization function.

A differential LU 1411 is created in the storage apparatus 1400 by the WritableSnapshot technology with the virtual LU 1414 as the parent LU. The computer 1000 which is running the VM 1010 makes the differential LU 1411 and the VHDD 1011 correspond to each other, and the VM 1010 can use the OSs and applications before the conversion into GI by using the VHDD file stored in the corresponding differential LU 1411.

Figure 14:
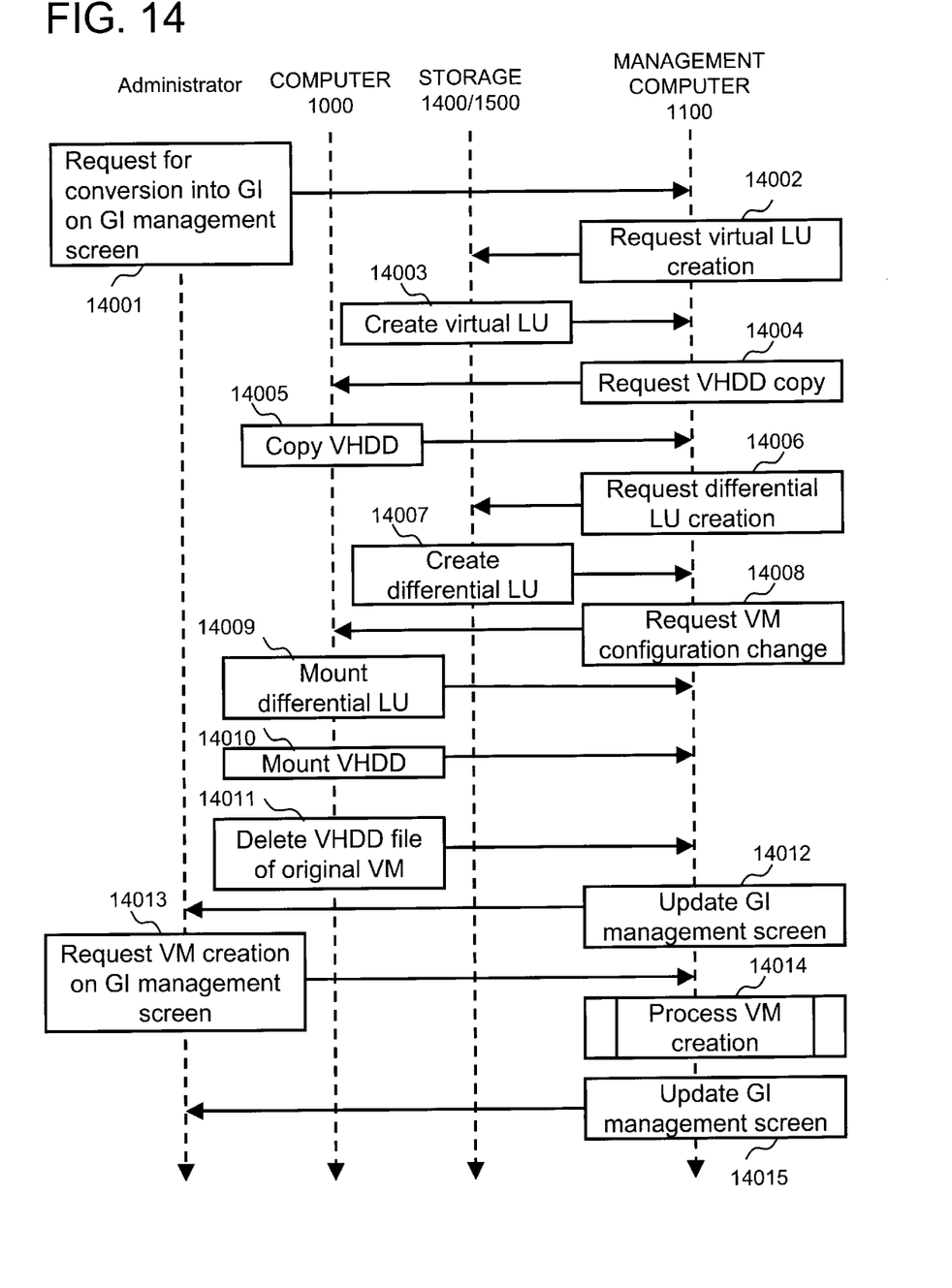
FIG. 14 is a diagram for explaining GI conversion processing according to Embodiment 1 of the present invention.

FIG. 14 shows a flow of converting a created VM into a GI and creating a VM in the present embodiment. In case of converting a created VM into a GI, the administrator transmits a request for displaying a request for converting a VM specified on the GI management screen (FIG. 16) into a GI to the management computer 1100 (step 14001). The GI management program 3001 in the management computer 1100 which receives the request transmits a virtual LU creation request to the storage apparatus which is the creation destination of the GI specified by the administrator (step 14002). The storage management program 4002 of the storage apparatus 1400 which received the request creates an LU 1415 in the storage apparatus 1400 and creates a virtual LU 1414 whose actual LU is the LU 1415 (step 14003).

Next, the GI management program 3001 transmits a VHDD copy request to the computer 1000 and the storage apparatus 1400 (step 14004). The storage management program 4002 of the storage apparatus 1400 which receives the request migrates or copies the VHDD in the computer 1000 which the VM to be converted into an administrator-specified GI utilizes to the actual LU 1415 (step 14005).

At this time, the GI management program 3001 creates a record setting "1400" for the EX_STORAGE 7001, "1414" for the EX_LU 7002, "1400" for the IN_STORAGE 7003, and "1415" for the IN_LU 7004 in the storage virtualization configuration information table 4003 (FIG. 7) in the storage apparatus 1400. At the same time, the program creates a record setting "G1" for the GLOBAL_LU 10001, "1400" for the STORAGE 10002, "1414" for the LOCAL_LU 10003, and "TRUE" for the GI 10004 in the LU number table 4005 (FIG. 11).

Next, the GI management program 3001 transmits a differential LU creation request to the storage apparatus 1400 (step 14006). The storage management program 4002 of the storage apparatus 1400 which receives the request creates a differential LU 1411 which uses the pool 1413 (step 14007).

At this time, the GI management program 3001 creates a record setting "1400" for the STORAGE 9001, "G1" for the PARENT_LU 9002, "1411" for the CHILD_LU 9003, and "1413" for the POOL 9004 to the snapshot configuration information table 4004 (FIG. 9) of the storage apparatus 1400.

Next, the GI management program 3001 transmits a VM configuration change request to the computer 1000 (step 14008). The computer 1000 which receives the request mounts the created differential LU 1411 (makes the LU correspond) to the VHDD (step 14009) and mounts the VHDD (makes the VHDD correspond) to the VM 1010 (step 14010).

Subsequently, the computer 1000 deletes the VHDD of the VM specified for conversion into the GI (step 14011). At this time, in the record whose VM 6001 is "1010" in the VM configuration information table 2004 (FIG. 6) in the computer 1000, the program changes the HOST_LU 6002 to "1011", the LU 6003 to "1411", and the VHDD 6004 to "1021".

Next, the GI management program 3001 in the management computer 1100 updates the contents of the GI management screen 16000 (FIG. 16) (step 14012). In case of creating a VM from a GI, the administrator transmits a VM creation request specified on the GI management screen 16000 to the management computer 1100 (step 14013). The GI management program 3001 of the management computer 1100 which received the request performs the VM creation processing (step 14014) and updates the contents of the GI management screen 16000 (step 14015).

Figure 15:
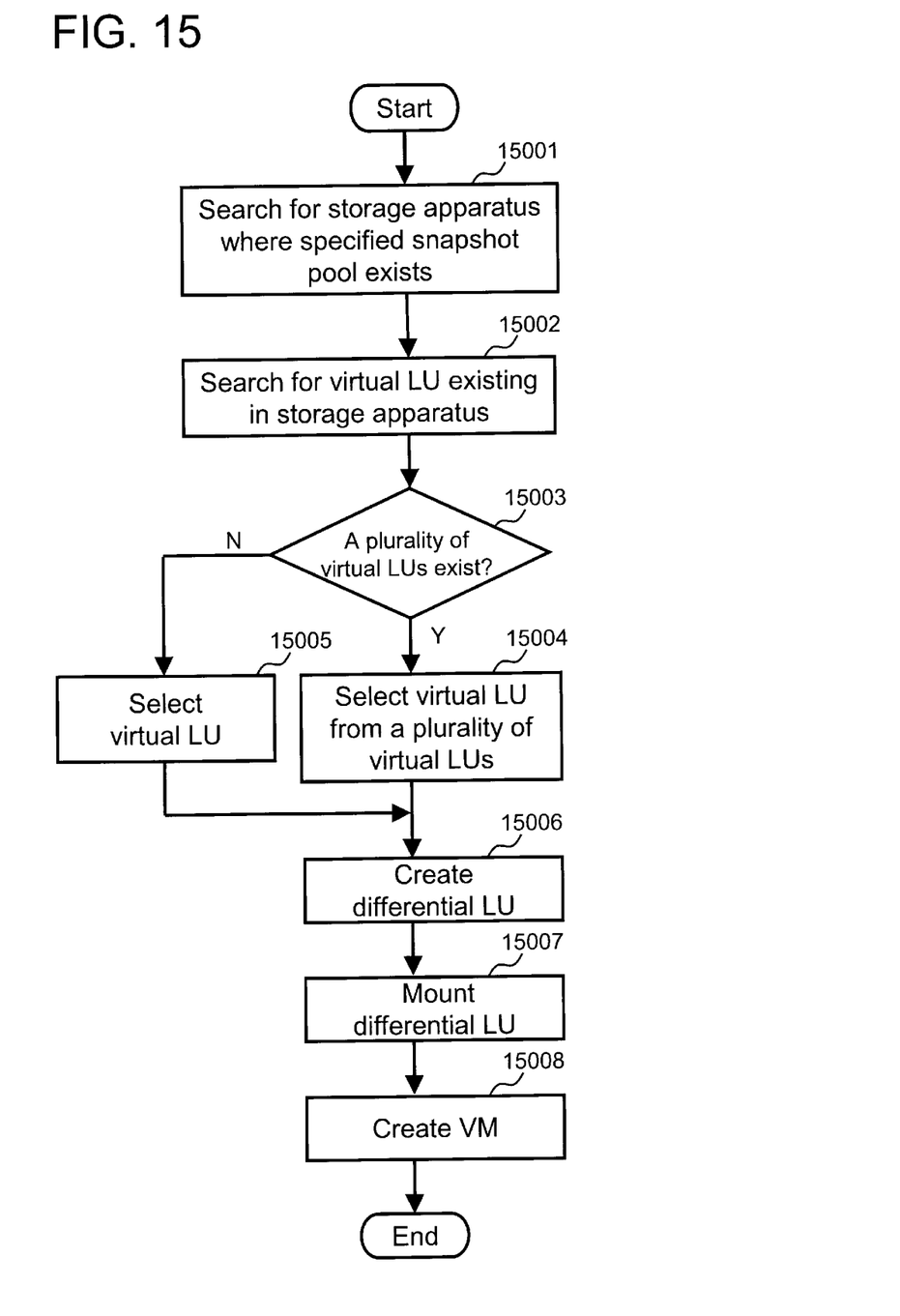
FIG. 15 is a diagram for explaining VM creation processing according to Embodiment 1 of the present invention.

FIG. 15 shows a processing flow of the VM creation processing. The GI management program 3001 in the management computer 1100 searches the snapshot configuration information table 4004 for a storage apparatus in which a snapshot pool for storing the data of the specified differential LU exists (step 15001).

The GI management program 3001 searches the LU number table 4005 for the virtual LU specified as a GI in the searched storage apparatus (step 15002). Sub-sequently, the GI management program 3001 determines whether a plurality of virtual LUs exist in the storage apparatus or not (step 15003). If the result of the determination at the step 15003 is false (branches to "N"), the GI management program 3001 selects the only virtual LU (step 15005).

If the result of the determination at the step 15003 is true (branches to "Y"), the GI management program 3001 selects the most appropriate virtual LU from the plurality of virtual LUs (step 15004). If a plurality of virtual LUs exist in the storage apparatus by being copied from the GI for load distribution, the GI management program 3001 selects a virtual LU whose load is small (for example, the number of differential LUs created based on the virtual LU is small, the number of VMs utilizing the differential LUs is small, the I/O amount for the differential LUs is small, or the amount of differential data stored in the snapshot pool for the differential LUs is small).

Next, the GI management program 3001 creates a differential LU by using the selected virtual LU (step 15006), mounts the created differential LU (step 15007), and creates a VM by using a VHDD stored in the mounted differential LU (step 15008). The VM can be created by the above-mentioned processing.

Figure 16:
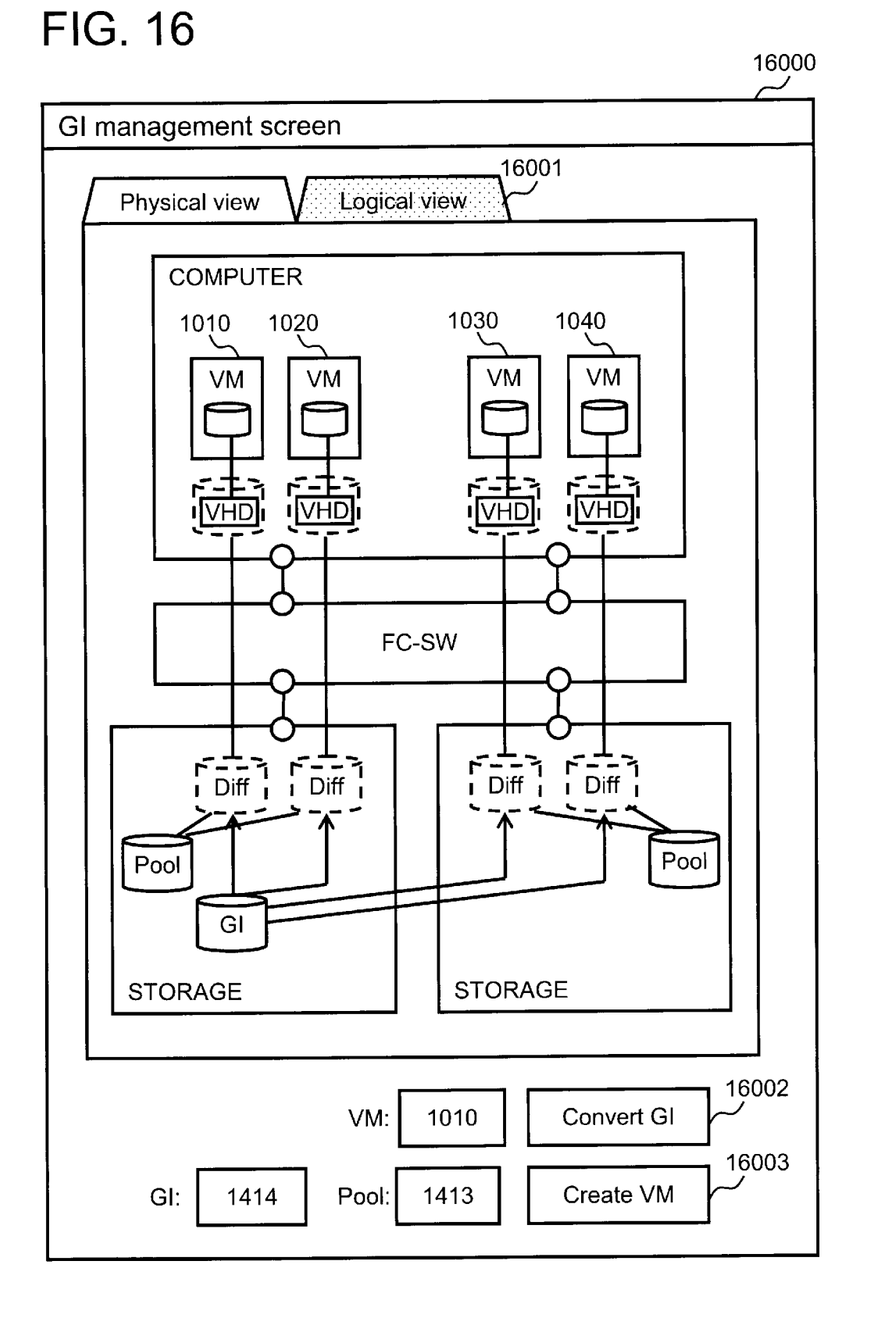
FIG. 16 is a diagram for explaining a GI management screen according to Embodiment 2 of the present invention.

FIG. 16 shows the configuration of the GI management screen 16000. By the GI management screen 16000, the administrator can ascertain the logical configuration of which differential LU is created from which GI (which can be displayed by selecting a tab 16001 named Physical view in the present embodiment) and the physical configuration.

Furthermore, by specifying a VM and pressing the Convert GI button 16002, the VM can be converted into a GI. Furthermore, by specifying a GI and a pool and pressing a Create VM button 16003, the VM duplicated from the GI can be created.

By the embodiment explained above, a GI can be shared as a virtual LU, and therefore the capacity efficiency of the storage apparatus can be improved. Furthermore, since it is not necessary to copy the GI at the time of creating a VM, the speed of creating the VM can be improved.

<Embodiment 2>

An example of sharing a GI of the storage apparatus 1400 used by the computer 1000 and being able to managing the storage apparatuses 1400 and 1500 as one storage apparatus in Embodiment 2 of the present invention is explained below.

Figure 17:
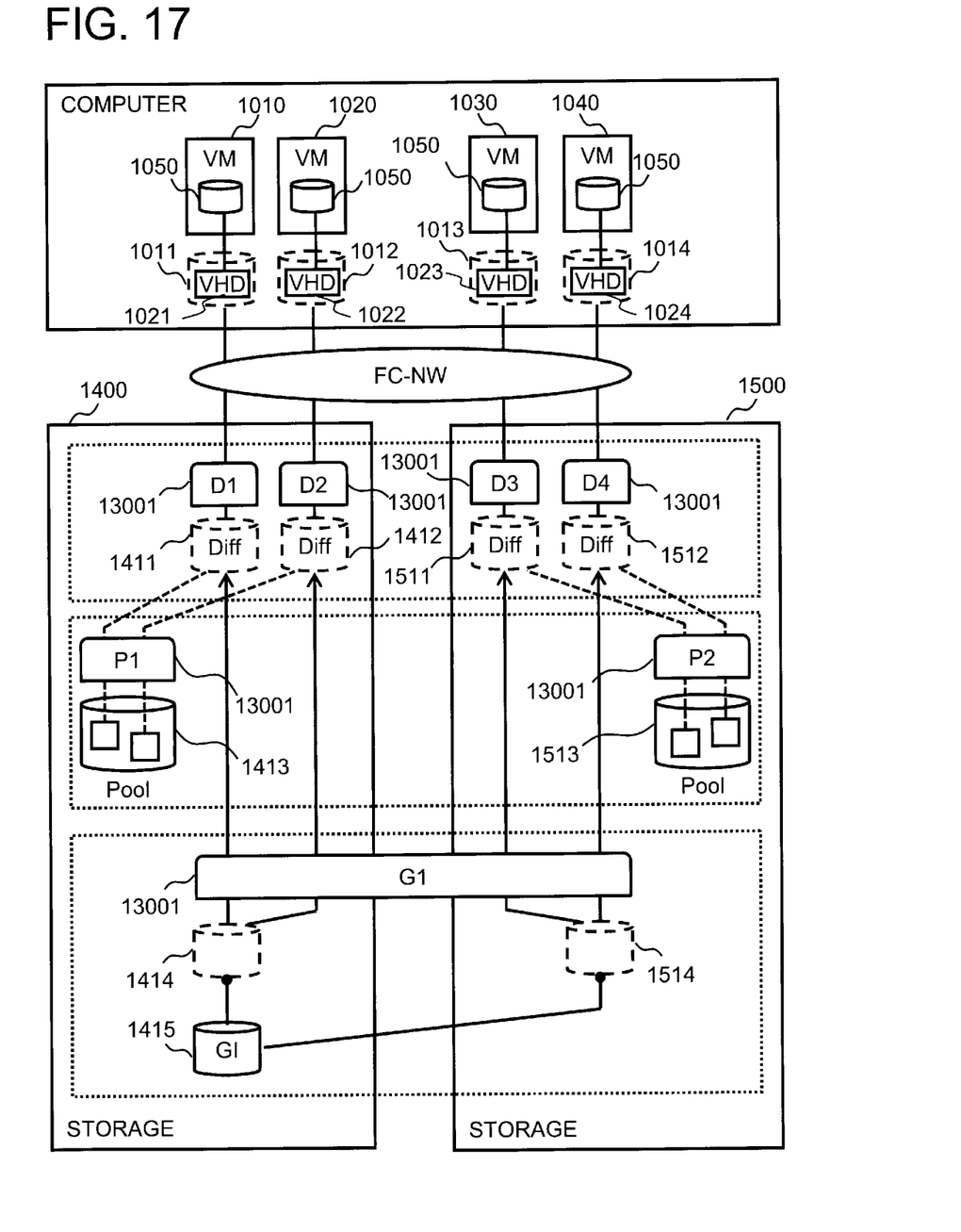
FIG. 17 is a diagram for explaining a GI configuration according to Embodiment 2 of the present invention.

FIG. 17 shows a conceptual diagram of the present embodiment. In the present embodiment, a record of identifiers D1, D2, D3, and D4 for making the differential LUs 1411, 1412, 1511, and 1512 created by the snapshot technology unique between the storage apparatuses 1400 and 1500 is registered in the LU number table 4005. By these identifiers D1, D2, D3, and D4, the differential LUs can be uniquely identified among a plurality of storage apparatuses.

Furthermore, a record of identifiers P1 and P2 for making the pools 1413 and 1513 which are the data storage destinations of the differential LUs unique between the storage apparatuses 1400 and 1500 is registered in the LU number table 4005. By the identifiers P1 and P2, the pools can be uniquely identified among a plurality of storage apparatuses.

By the present embodiment, a GI can be shared among a plurality of storage apparatuses, and therefore the capacity efficiency of the storage apparatus can be improved. Furthermore, since it is not necessary to copy the GI at the time of creating a VM, the speed of creating the VM can be improved. Furthermore, the storage apparatuses 1400 and 1500 can be managed as a single apparatus.

<Embodiment 3>

A case of directly sharing a GI of the storage apparatus 1400 used by the computer 1000 in Embodiment 3 of the present invention is explained below.

Figure 18:
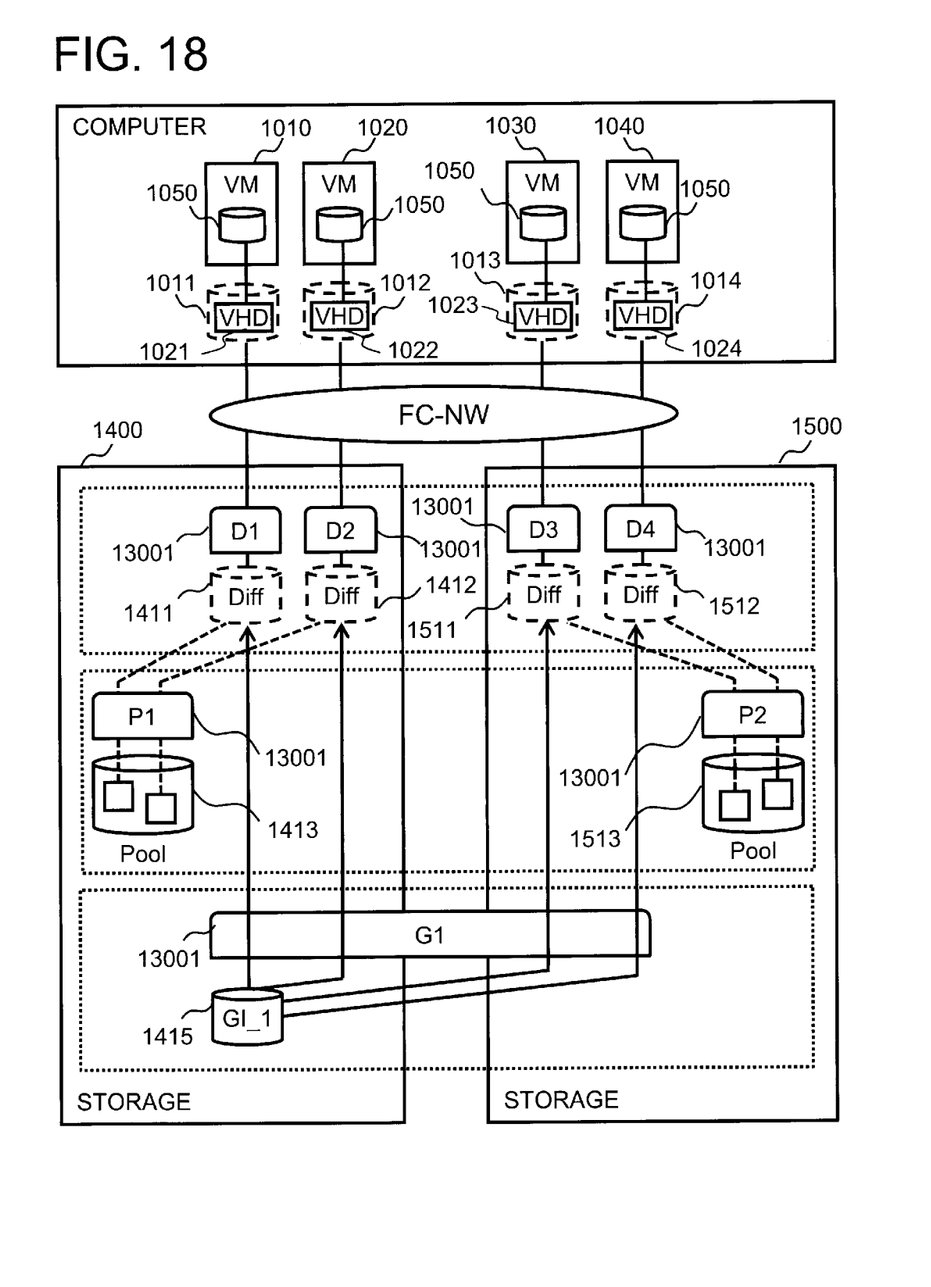
FIG. 18 is a diagram for explaining a GI configuration according to Embodiment 3 of the present invention.

FIG. 18 shows a conceptual diagram of the present embodiment. In the present embodiment, a record of identifiers D1, D2, D3, and D4 for making the differential LUs 1411, 1412, 1511, and 1512 created by the snapshot technology unique between the storage apparatuses 1400 and 1500 is registered in the LU number table 4005. By these identifiers D1, D2, D3, and D4, the differential LUs can be uniquely identified among a plurality of storage apparatuses.

Furthermore, a record of identifiers P1 and P2 for making the pools 1413 and 1513 which are the data storage destinations of the differential LUs unique between the storage apparatuses 1400 and 1500 is registered in the LU number table 4005. By the identifiers P1 and P2, the pools can be uniquely identified among a plurality of storage apparatuses.

Furthermore, to the differential LUs 1411, 1412, 1511, and 1512, instead of making the virtual LUs created by the storage virtualization function as parent LUs which create snapshots correspond, the LU 1415 which is a GI is directly made to correspond. Therefore, a record setting "1415" instead of "G1" for the PARENT_LUs 9002 and "1411", "1412", "1511", and "1512" for the CHILD_LUs 9003 in the snapshot configuration information tables 4004 (FIG. 9 and FIG. 10) is generated.

By the present embodiment, the GI can be directly shared, and therefore the capacity efficiency of the storage apparatus can be improved. Furthermore, since it is not necessary to manage the relationship among GIs, the management cost can be reduced.

The three embodiments are explained above about GI creation and sharing among storage apparatuses. However, the present invention is not limited to the three embodiments. For example, it is evidently possible to share a GI created in the storage apparatus by maintaining the management tables such as the LU number table 4005 in the host, the network switch such as the FC switch, and others instead of the storage apparatus by a virtual sharing method.

Industrial Applicability

The present invention can be applied to information processing apparatuses such as large-scale computers, servers, and personal computers.

Reference Signs List

1000 Computer
  1001 FC_I/F
  1002 CPU
  1003 Input device
  1004 Output device
  1005 IP_I/F
  1006 Storage device
  1007 Memory
  1010 VM
  1011, 1012, 1013, 1014 HOST_LU
  1021, 1022, 1023, 1024 VHDD
  1050 VHDD file
  1100 Management computer
  1101 FC_I/F
  1102 CPU
  1103 Input device
  1104 Output device
  1105 IP_I/F
  1106 Storage device
  1107 Memory
  1200 FC switch
  1201 CPU
  1202 Memory
  1203 FC_I/F
  1204 IP_I/F
  1300 IP switch
  1301 CPU
  1302 Memory
  1303 IP_I/F
  1400 Storage apparatus
  1401 FC_I/F
  1402 IP_I/F
  1403 Controller
  1404 CPU
  1405 Memory
  1406, 1407 HDD
  1411, 1412, 1413, 1414, 1415 LU
  1500 Storage apparatus
  1501 FC_I/F
  1502 IP_I/F
  1503 Controller
  1504 CPU
  1505 Memory
  1506, 1507 HDD
  1511, 1512, 1513, 1514 LU
  2001 Data input/output program
  2003 VM management program
  2004 VM configuration information table
  3001 GI management program
  4001 Data processing program
  4002 Storage information management program
  4003 Storage virtualization configuration information table
  4004 Snapshot configuration information table
  4005 LU number table
  7001 EX_STORAGE
  7002 EX_LU
  7003 IN_STORAGE
  7004 IN_LU
  9001 STORAGE
  9002 PARENT_LU
  9003 CHILD_LU
  9004 POOL
  10001 GLOBAL_LU
  10002 STORAGE
  10003 LOCAL_LU
  13001 G1
  16001 Tab
  16002 Convert GI button
  16003 Create VM button

The invention claimed is:

1. A storage system configured of two or more storage apparatuses each of which comprises an interface unit which is coupled to a computer operating a plurality of virtual computers and is coupled to the virtual computers via a network and a control unit and a storage unit which are coupled to the interface unit, wherein     a logical volume in a first storage apparatus is assigned to a differential virtual logical volume of the first storage apparatus and is also assigned to a differential virtual logical volume of a second storage apparatus so that the logical volume is shared, and     a logical volume in the first storage apparatus and a differential virtual logical volume of the first storage apparatus or a differential virtual logical volume of the second storage apparatus are assigned to the virtual computer by the control unit of the first storage apparatus.

2. The storage system according to claim 1, wherein the logical volume in the first storage apparatus is assigned to the virtual logical volume of the relevant first storage apparatus and is also assigned to the virtual logical volume of the second storage apparatus and the logical volume is shared,     a differential virtual logical volume for the virtual logical volume of the first storage apparatus is assigned to the virtual logical volume of the first storage apparatus,     a differential virtual logical volume for the virtual logical volume of the second storage apparatus is assigned to the virtual logical volume of the second storage apparatus, and     a logical volume in the first storage apparatus and a differential virtual logical volume of the first storage apparatus or a differential virtual logical volume of the second storage apparatus are assigned to the virtual computer by the control unit of the first storage apparatus.

3. The storage system according to claim 1, wherein an area of the storage unit of the first storage apparatus is assigned to the differential virtual logical volume of the first storage apparatus, and an area of the storage unit of the second storage apparatus is assigned to the differential virtual logical volume of the second storage apparatus.

4. The storage system according to claim 2, wherein an area of the storage unit of the first storage apparatus is assigned to the differential virtual logical volume of the first storage apparatus, and an area of the storage unit of the second storage apparatus is assigned to the differential virtual logical volume of the second storage apparatus.

5. The storage system according to claim 3, wherein the virtual computer, the logical volume, the virtual logical volume and the differential virtual logical volume are assigned by using one or more of the following management tables:

(1) a management table composed of information of the virtual computer, information of a virtual hard disk drive of the virtual computer, and information of the virtual hard disk drive in the storage apparatus;

(2) a management table composed of information of a storage apparatus in which a virtually recognized LU exists, information of the virtually recognized LU, information of a storage apparatus in which an actual LU of the virtually recognized LU exists, and information of the actual LU of the virtually recognized LU;

(3) a management table composed of information of the storage apparatus, differential information, and information of a storage destination of the differential information; and (4) a management table composed of information of an LU unique among storage apparatuses, information of the storage apparatus in which the actual LU exists, and information of the actual LU.

6. The storage system according to claim 4, wherein the virtual computer, the logical volume, the virtual logical volume and the differential virtual logical volume are assigned by using one or more of the following management tables:

(1) a management table composed of information of the virtual computer, information of a virtual hard disk drive of the virtual computer, and information of the virtual hard disk drive in the storage apparatus;

(2) a management table composed of information of a storage apparatus in which a virtually recognized LU exists, information of the virtually recognized LU, information of a storage apparatus in which an actual LU of the virtually recognized LU exists, and information of the actual LU of the virtually recognized LU;

(3) a management table composed of information of the storage apparatus, differential information, and information of a storage destination of the differential information; and (4) a management table composed of information of an LU unique among storage apparatuses, information of the storage apparatus in which the actual LU exists, and information of the actual LU.

7. The storage system according to claim 5, wherein a correspondence relationship among the logical volume, the differential virtual logical volume, the virtual computer and the storage unit is displayed on a management terminal.

8. The storage system according to claim 6, wherein a correspondence relationship among the logical volume, the differential virtual logical volume, the virtual computer and the storage unit is displayed on a management terminal.

9. The storage system according to claim 5, wherein an identification information for uniquely identifying a differential virtual logical volume among storage apparatuses and an identification information for uniquely identifying an area of the storage unit among storage apparatuses are stored in the management table composed of information of an LU unique among storage apparatuses, information of the storage apparatus in which the actual LU exists, and information of the actual LU.

10. The storage system according to claim 6, wherein an identification information for uniquely identifying a differential virtual logical volume among storage apparatuses and an identification information for uniquely identifying an area of the storage unit among storage apparatuses are stored in the management table composed of information of an LU unique among storage apparatuses, information of the storage apparatus in which the actual LU exists, and information of the actual LU.

11. A volume sharing method for a storage system configured of two or more storage apparatuses each of which comprises an interface unit which is coupled to a computer operating a plurality of virtual computers and is coupled to the virtual computers via a network and a control unit and a storage unit which are coupled to the interface unit, comprising, a step wherein a logical volume in a first storage apparatus is assigned to a differential virtual logical volume of the first storage apparatus and is also assigned to a differential virtual logical volume of the second storage apparatus and the logical volume is shared, and a step of assigning a logical volume in the first storage apparatus and a differential virtual logical volume for the first storage device or a differential virtual logical volume for the second storage device to the virtual computer, wherein the above step is performed by the control unit of the first storage apparatus.

12. The volume sharing method according to claim 11, further comprising:

a step wherein a logical volume of a first storage apparatus is assigned to a virtual logical volume of the first storage apparatus and is also assigned to a virtual logical volume of a second storage apparatus so that the logical volume is shared, a step wherein a differential virtual logical volume for the virtual logical volume of the first storage apparatus is assigned to the virtual logical volume of the first storage apparatus, a step wherein a differential virtual logical volume for the virtual logical volume of the second storage apparatus is assigned to the virtual logical volume of the second storage apparatus, and a step wherein a logical volume in the first storage apparatus and a differential virtual logical volume of the first storage apparatus or a differential virtual logical volume of the second storage apparatus are assigned to the virtual computer, wherein the above step is performed by the control unit of the first storage apparatus.

* * * * *